(12) United States Patent
Oshnock et al.

(10) Patent No.: US 7,306,238 B2
(45) Date of Patent: Dec. 11, 2007

(54) COLLET AND LOCK NUT

(75) Inventors: Robert E. Oshnock, Latrobe, PA (US); Michael R. McCormick, Greensburg, PA (US); Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 92 days.

(21) Appl. No.: 11/069,399

(22) Filed: Mar. 1, 2005

(65) Prior Publication Data
US 2006/0197291 A1    Sep. 7, 2006

(51) Int. Cl.
B23B 31/12    (2006.01)
B23B 31/20    (2006.01)

(52) U.S. Cl. .................. 279/20; 279/46.1; 279/48; 408/59

(58) Field of Classification Search .......... 279/20, 279/42, 48, 52, 56, 43.9, 46.9, 157; 408/56, 408/57, 59
See application file for complete search history.

(56) References Cited

U.S. PATENT DOCUMENTS

| | | | | |
|---|---|---|---|---|
| 2,533,758 A | * | 12/1950 | Better et al. ................. 279/16 |
| 5,028,178 A | * | 7/1991 | Ronen ........................ 409/136 |
| 5,340,127 A | * | 8/1994 | Martin ........................ 279/20 |
| 5,405,220 A | * | 4/1995 | Ishikawa ..................... 408/56 |
| 5,522,605 A | * | 6/1996 | Lewis et al. ................. 279/49 |
| 5,567,093 A | * | 10/1996 | Richmond ................... 409/136 |
| 5,911,421 A | * | 6/1999 | Steele ........................ 279/46.9 |
| 5,975,817 A | * | 11/1999 | Komine ...................... 409/136 |
| 5,984,595 A | * | 11/1999 | Mizoguchi ................... 408/57 |
| 6,601,857 B1 | * | 8/2003 | Richmond ................... 279/20 |

FOREIGN PATENT DOCUMENTS

CH    684938 A5 * 2/1995
WO    WO01/34331 A1   5/2001

* cited by examiner

Primary Examiner—Monica Carter
Assistant Examiner—Eric A. Gates
(74) Attorney, Agent, or Firm—Larry R. Meenan

(57) ABSTRACT

An assembly generally comprises a collet for receiving a cutting tool shank and a lock nut for creating a gripping force between the collet and the cutting tool shank. The collet has a nose and the lock nut has a front face that is substantially flush with the nose. The lock nut further has a fastening element that mates with a fastening element of a coolant sealing ring for attaching the coolant sealing ring to the lock nut so that the coolant sealing ring may be detached from the lock nut.

14 Claims, 5 Drawing Sheets

COLLET AND LOCK NUT

FIELD OF THE INVENTION

The present invention relates to chucks and sockets and, more particularly, to a collet and lock nut for use with machine tools. Most particularly, the present invention relates to a flush collet and lock nut that can optionally be used with a coolant sealing ring (i.e., sealing disk and optional sealing disk cap) having improved sealing characteristics.

Collets for use in tool-holding chuck assemblies are well known. Such collets generally comprise a tubular body formed from a plurality of elongated, flexible steel fingers. The fingers are separated by longitudinal collet saw slots that impart some degree of radial flexibility to the collet, which allows the collet to selectively grip the shank of a cutting tool, such as a drill bit. Adjacent gripping fingers are interconnected by an alternating pattern of metal webs to form a one-piece collet body. In operation, the collet body is inserted in a complementary-shaped opening in a chuck shaft so that a distal end of the collet body projects out of the shaft. An annular lock nut having an inner diameter screw thread that matches an outer diameter screw thread on the shaft is then installed over the shaft and distal end of the collet body. The lock nut has a nose ring with a flustoconical cam surface that engages the distal end of the collet body and squeezes it radially inwardly as the lock nut is screwed onto the chuck shaft. The radial compression that the lock nut applies to the distal end of the collet body flexes the body inwardly, creating a gripping force between the inner diameter of the collet body and a tool shank inserted therein.

Sealed or bonded collets are also well known. An example of a bonded collet is disclosed in U.S. Pat. No. 5,911,421, assigned to Kennametal Inc., located in Latrobe, Pa., the entire specification of which is incorporated herein by reference. In such collets, the slots separating the individual collet fingers are filled with a collet bonding substance, such as a silicon-based rubber compound, for two reasons. First, the filling of the collet slots with such a compound prevents pressurized coolant intended to flow through a bore in a gripped tool shank from flowing away from the shank and out through the walls of the collet body. Second, the bonding agent prevents the entry of dirt, metal swarf, and other debris from entering the collet slots and lodging between the shaft and the inner surface of the collet fingers. This function is important, as the presence of dirt or other debris in such locations can adversely affect the ability of the collet to uniformly grip the outer surface of the shank of the tool, which in turn can result in an off-center grip that might seriously compromise the accuracy of the bores or other cuts made by the tool.

While such bonded collets have been found to work well for their intended purpose, the-recent use of coolants under higher pressure (i.e., on the order to 1000-1500 psi) has necessitated the use of harder, stiffer bonding agents to prevent the formation of leak paths through the collet slots. These stiffer bonding agents are less compressible, and adversely interfere with the radial compressibility of the collet. In the past, when the coolant pressures were lower (i.e., under 1000 psi) softer, more compressible bonding agents could be used to fill the slots of the body without any significant danger of leak paths occurring. The relatively more compressible bonding agents used in the prior art did not stiffen the radial resiliency of the collet to an extent where the collet body could not be readily compressed by the lock nut to securely grip a tool shank. Even more importantly, the use of such pliant bonding agents would not render the distal end of the collet body so stiff as to interfere with manual removal of the lock nut if and when it became necessary to change the collet body to grip a shaft of a different size. Unfortunately, the use of stiffer bonding agents, such as one sold under the trademark SUPERFLEX 587 and manufactured by Loctite, Inc., located in Rocky Hill, Conn., has not only reduced the radial compressibility of the collet body to the extent to where manual compression around a shaft via the lock nut is difficult, but has further made it very difficult for a system operator to manually separate the collet body from the lock nut when a change of collet becomes necessary.

To overcome the foregoing deficiencies, a collet was designed that was radially compressible to an extent to where the gripping of tool shanks and the removal of the lock nut was easily performed by a system operator, but yet which could conduct high pressure coolant streams while preventing leakage through the collet slots. The collet was of the type including a tubular body formed from a plurality of gripping fingers that were separated by elongated slots filled with a bonding agent, wherein agent-free gaps were provided in the slots of the collet body for increasing the radial flexibility of the collet. The tubular collet body included a distal end that was radially compressible by a nose ring of a lock nut, and the agent-free gaps were disposed immediately behind this distal end. Such an arrangement substantially increased the radial compressibility of the distal end of the collet body while still maintaining a sufficient amount of bonding agent in the segment of the slots traversing the distal collet end to effectively prevent dirt, swarf, and other debris from entering the slots of the collet body, and the space between a tool shank and the inner diameter of the collet gripping fingers. While this collet was found to work well for its intended purpose, the collet had a tendency to leak coolant over the outer diameter and the inner diameter of the collet.

Due to the high price of coolant and the cost of coolant disposal, it is necessary to prevent excessive leakage onto unwanted areas of a workpiece where coolant is not needed. This leakage occurs anywhere from low to high coolant pressures. Due to this leakage problem, most, if not all, coolant is flooded on the lock nut and the workpiece. A very minimum amount of high-pressure coolant is directed down coolant access holes in the shank of the cutting tool. With insufficient coolant being directed to the cutting edges of the cutting tool, chips tend to pack in the workpiece with poor chip evacuation from the workpiece hole. The life of the cutting tool is drastically reduced because of insufficient chip evacuation.

To overcome these deficiencies, a sealing disk was designed to improve sealing characteristics when using high-pressure coolant. An example of such a sealing disk is disclosed in WO 01/34331 A1, assigned to REGO-FIX AG. The sealing disk is provided with an annular circumferential groove and an O-ring in the groove for providing a sealing against high-pressure coolant between the shank of the cutting tool and the sealing disk. A similar seal is provided between the lock nut and the sealing disk. In this design, the locknut is not flush with the collet but instead extends beyond the collet so that the collet is axially recessed within locknut. This presents a problem because is lengthens that tool, which requires more space for the tool operation. A shorter tool requires less space for operation and thus is most desirable.

Clearly, there is a need for an improved seal design that directs all coolant through the access holes in the shank of the cutting tool and to the cutting edges of the cutting tool, while preventing coolant from leaking out onto unwanted areas of a workpiece where coolant is not needed. Ideally, such an improved design should not lengthen the tool, or involve any redesign or machining of conventional collet bodies and lock nuts, and should be installable onto existing collets (sealed or otherwise) with a minimum amount of effort and expense. Finally, such an improved sealed collet should still be able to resist the entry of dirt, debris, and metal swarf between the collet fingers and a gripped tool shank.

SUMMARY OF THE INVENTION

Generally speaking, the invention is directed to an assembly generally comprising a collet for receiving a cutting tool shank a lock nut for creating a gripping force between the collet and the cutting tool shank. The collet has a nose and the lock nut has a front face that is substantially flush with the nose. The lock nut further has a fastening element that mates with a fastening element of a coolant sealing ring for attaching the coolant sealing ring to the lock nut so that the coolant sealing ring may be detached from the lock nut.

The invention is also directed to an assembly comprising a collet and a lock nut. The collet includes a tubular collet body having a nose and defining a cylindrically shaped passageway for receiving the tool shank. The passageway is adapted to direct pressurized coolant to coolant access holes in the tool shank. The lock nut is formed from an annular housing having a front face, which is substantially flush with the nose of the collet body, and a fastening element. A coolant sealing ring has a fastening element that mates with the fastening element of the annular housing for attaching the coolant sealing ring to the annular housing so that the coolant sealing ring is detachable from the annular housing. A first fluid tight seal is provided between the annular housing and the coolant sealing ring. A second fluid tight seal provides a seal between the cutting tool shank and the sealing disk.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
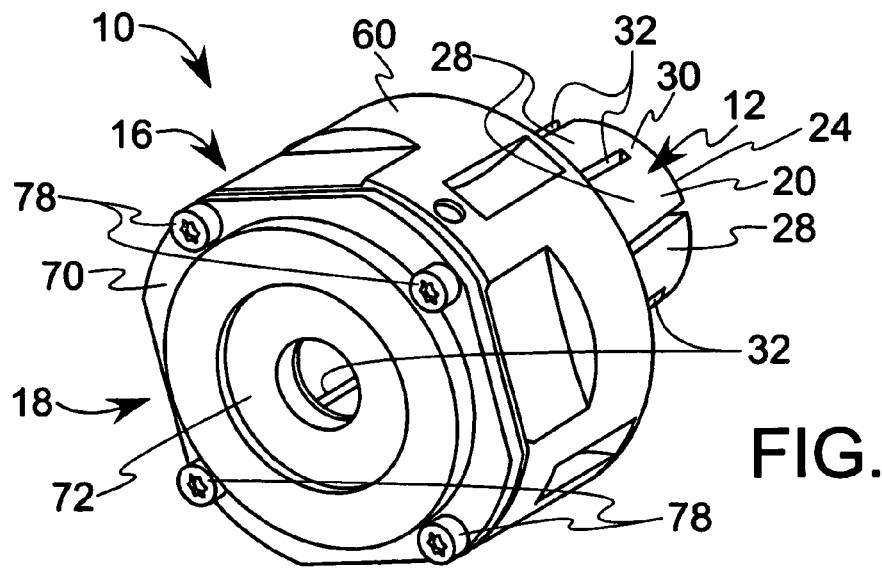
FIG. 1 is a front perspective view of a collet and lock nut according to one embodiment of the invention.
Figure 2:
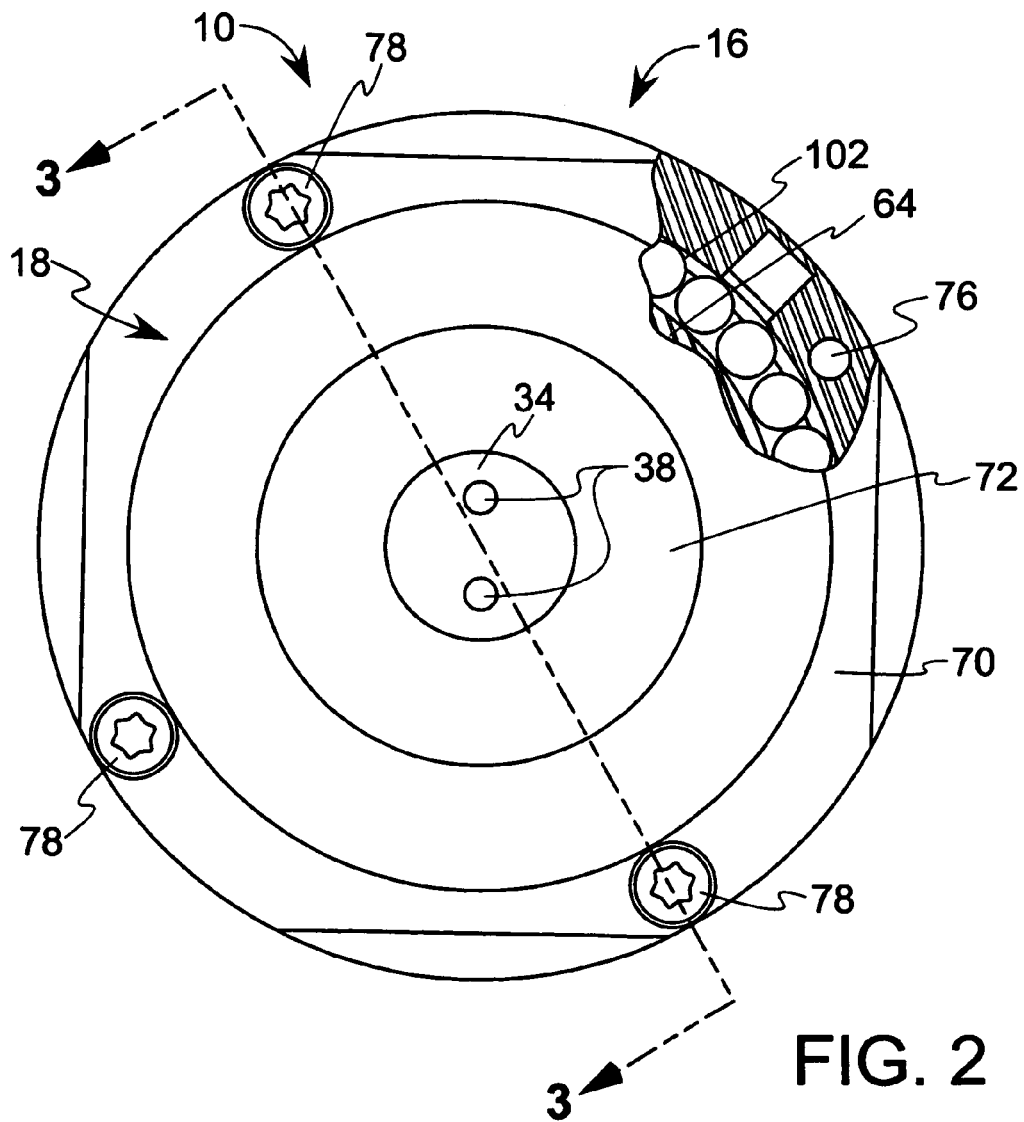
FIG. 2 is a partially cutaway front elevational view of the collet and lock nut shown in FIG. 1.
Figure 3:
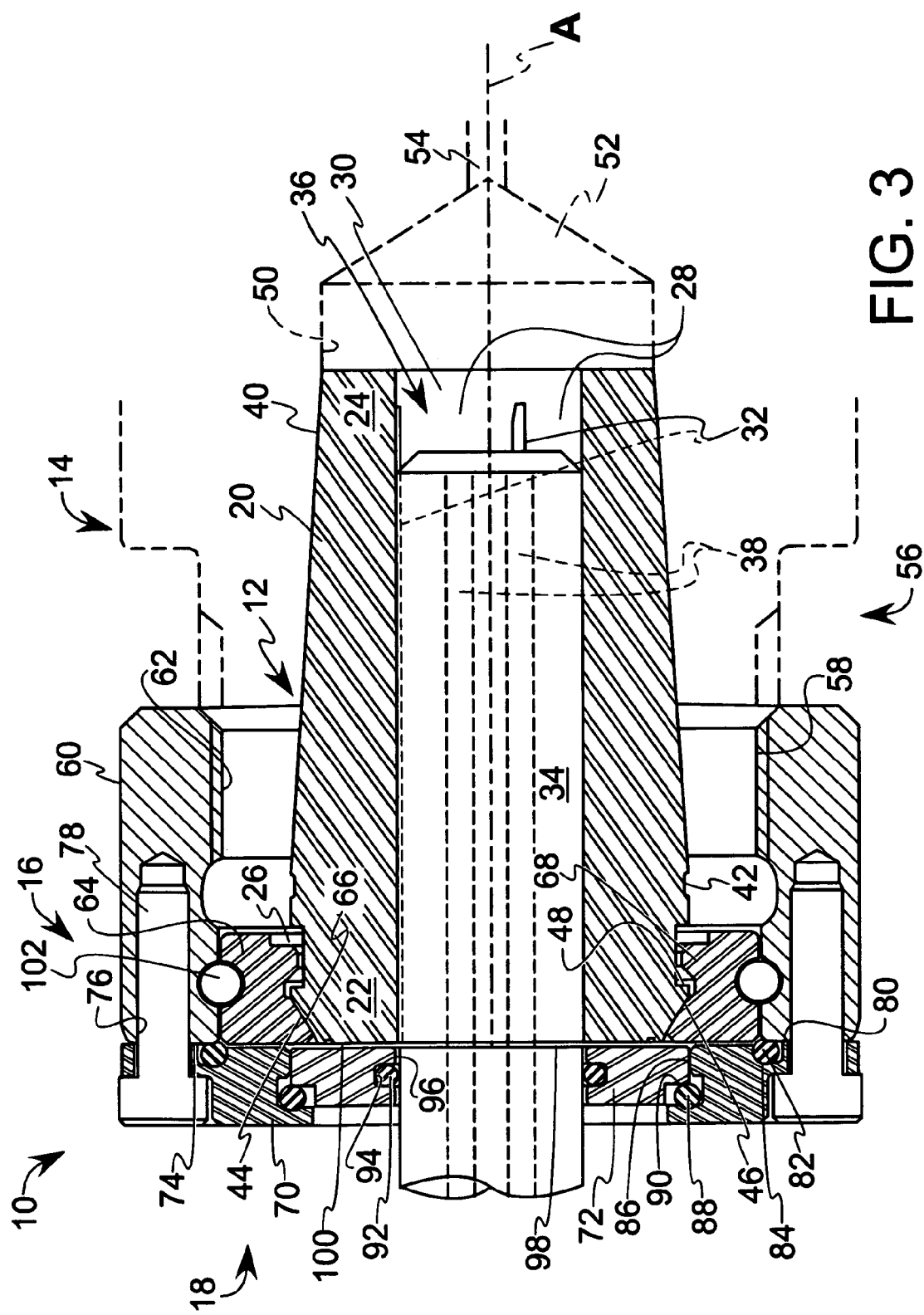
FIG. 3 is a cross-sectional view of the collet and lock nut taken along the line 3-3 in FIG. 2.

With reference now to the drawings, wherein like numerals designate like components throughout all of the several figures, there is illustrated in FIGS. 1-3 a chuck assembly 10 comprising a collet 12, a chuck shaft 14, a lock nut 16, and a coolant sealing ring 18. The collet 12 generally comprises a tubular collet body 20 having a distal end 22 and a proximal end 24 separated by an annular recess 26. The collet body 20 is formed from a generally parallel array of elongated gripping fingers 28 interconnected by webs 30 of the same resilient steel alloy that forms the entire collet body 20. The gripping fingers 28 are separated by elongated slots 32 as shown. The presence of the slots 32 allows the collet body 20 to be radially compressed by the lock nut 16 to grip the shank 34 of a cutting tool (not shown), and as will be described in more detail hereinafter.

The interior of the collet body 20 defines a cylindrically-shaped passageway 36 that is concentrically provided along the axis of rotation of the collet 12 for receiving the shank 34 of the cutting tool which may be, for example, a drill. The tool shank 34 may include a coolant access hole 38 for conducting a pressurized coolant to the cutting portion of the tool (not shown). The passageway 36 directs pressurized coolant flowing from an opening in a chuck shaft 14 to the shank receiving passageway 36.

The exterior of the collet body 20 flares out into a frustoconical portion 40 toward the proximal end 24 of the collet body 20. An annular guide groove 42 is provided in the frustoconical portion 40 near the distal end 22 to provide a visual indication as to whether or not the collet body 20 is inserted at a proper depth into a chuck shaft 14. The distal end 22 includes an annular cam surface 44 along its circumferential edge which cooperates with a mating cam surface 46 of the lock nut 16 to radially compress the gripping fingers 28 into gripping engagement with the tool shank 34. A ledge 48 is provided behind the annular cam surface 44 to facilitate the removal of the collet body 20 from a chuck shaft 14 via the lock nut 16, as described in more detail hereinafter.

The chuck shaft 14 has a frustoconical cavity 50 that is complementary in shape to the frustoconical portion 40 toward the proximal end 24 of the collet body 20. The cavity 50 terminates in a conical end portion 52 which in turn leads to a coolant conducting passageway 54. The passageway 54 extends collinearly with the axis of rotation A of the chuck shaft 14. Opposite the passageway 54, the chuck shaft 14 terminates in an annularly recessed end portion 56. A screw thread 58 circumscribes the outer diameter of the end portion 56.

The lock nut 16 is formed from an annular housing 60 having a screw thread 62 that circumscribes its inner diameter, as shown. The screw thread 62 is engageable with the screw thread 58 that circumscribes the recessed end portion 56 of chuck shaft 14. The opposite end of the annular housing 60 carries a nose ring 64 having a cam surface 46, as mentioned above. As is evident from the drawing, the cam surface 46 is a frustoconical surface complementary in shape to the annular cam surface 44 of the distal end 22 of collet body 20. Immediately behind the cam surface 46 of the nose ring 64 is an annular shoulder 68 which fits into the annular recess 26 of the collet body 20 when the lock nut 16 is assembled over the collet 12. The shoulder 68 is used to withdraw the collet body 20 from the frustoconical cavity 50 when the lock nut 16 is turned so as to detach from the end of the chuck shaft 14.

In accordance with the present invention, the coolant sealing ring 18 is attached to the distal end 22 of the annular housing 60. The coolant sealing ring 18 comprises a sealing disk cap 70 and a collet sealing disk 72. The sealing disk cap 70 is attached to the annular housing 60. This may be accomplished in any suitable manner. In the illustrated embodiment of the invention, the annular housing 60 has a front face 74 and a plurality of tapped holes 76 is preferably provided in the front face 74. Although four tapped holes 76 are shown, fewer or more tapped holes may be suitable for carrying out the invention. The sealing disk cap 70 is attached to the front face 74, preferably by the provision of screws 78, which may be threadable into the tapped holes 76 to render the sealing disk cap 70 detachable. The sealing disk cap 70 has a disk face 80 that mates with the front face 74 of the annular housing 60. A first fluid tight seal 82 may be provided between the mating faces. This seal 82 may be in the form of an O-ring, and is most preferably a rubber O-ring, although other seals may be suitable for carrying out the invention. Common rubber O-rings may not stand up to the coolants used today. Consequently, the preferred material for the O-ring is flurocarbon rubber. A commercial example of this material is Viton, which is produced by DuPont, in Wilmington, Del. In the illustrated embodiment, the seal 82 is adapted to reside in a face groove 84 in the sealing disk cap 70. When the screws 78 are threaded into the tapped holes 76, the seal 82 prevents coolant fluid from leaking out between the mating faces.

The sealing disk cap 70 has an inner diameter 86 for receiving a collet sealing disk 72. A second fluid tight seal 88 may be inserted into an inner diameter shoulder 90 of the sealing disk cap 70. The seal 88 is preferably an O-ring, although other seals may be suitable for carrying out the invention. To aid in assembling the collet sealing disk 72 and the sealing disk cap 70, the seal 88 may be greased or otherwise supported to hold the seal 88 in place during assembly. This seal 88 provides a seal between the sealing disk cap 70 and the sealing disk 72. The sealing disk 72, in turn, has a third fluid tight seal 92, such as the O-ring shown, provided in a groove 94 in an inner diameter wall 96. This seal 92 provides a seal between the cutting tool shank 34 and the sealing disk 72. It should be noted that a gap 98 is preferably present between the nose 100 of the collet 12 and the collet sealing disk 72. The gap 98 prevents the force of the cap screws 78 from tightly compressing the front face 74 of the lock nut 16 against the lock nut nose ring 64. This permits the lock nut 16 to be free to move relative to a lock nut nose ring 64 via nose ring ball bearings 102.

The coolant sealing ring 18 according to the present invention retains coolant inside the chuck assembly 10. This prevents coolant from leaking out onto a workpiece (not shown). By preventing coolant from leaking out onto a workpiece, cost associated with coolant disposal is reduced. Moreover, by directing all coolant into the coolant access holes 38 in the cutting tool shank 34 and to the cutting edge (not shown) of the cutting tool, the life of the cutting tool is increased. In addition, the coolant sealing ring 18 eliminates the necessity for a collet bonding substance and allows conventional unbonded collets to be used in applications where bonded collets are presently needed. By eliminating the necessity for bonding substance to be added to the collet saw slots, manufacturing costs are reduced. By eliminating the need for bonded collets, inventory and inventory costs are reduced.

In operation, the coolant sealing ring 18 may be detached to permit the lock nut 16 to be used without high-pressure coolant, or attached to permit the same lock nut 16 to be used with high-pressure coolant. The cost benefit of the present invention is at least two fold. The lock nut 16 according to the present invention, with provisions for attaching a coolant sealing ring 18, replaces two current designs. Therefore, the supplier of the lock nut 16 only has to make and stock a single design. This decreases both the manufacturing cost as well and inventory cost for the lock nut 16. The coolant sealing ring 18 is much less costly than a conventional dedicated coolant seal lock nut would be as well. Inventory and manufacturing costs of the coolant seal ring 18 will be less than that of the dedicated coolant seal lock nut. Using commercially available coolant seal disks allows for one coolant seal ring design for each collet nut size. These same benefits apply to the end user as well.

Figure 4:
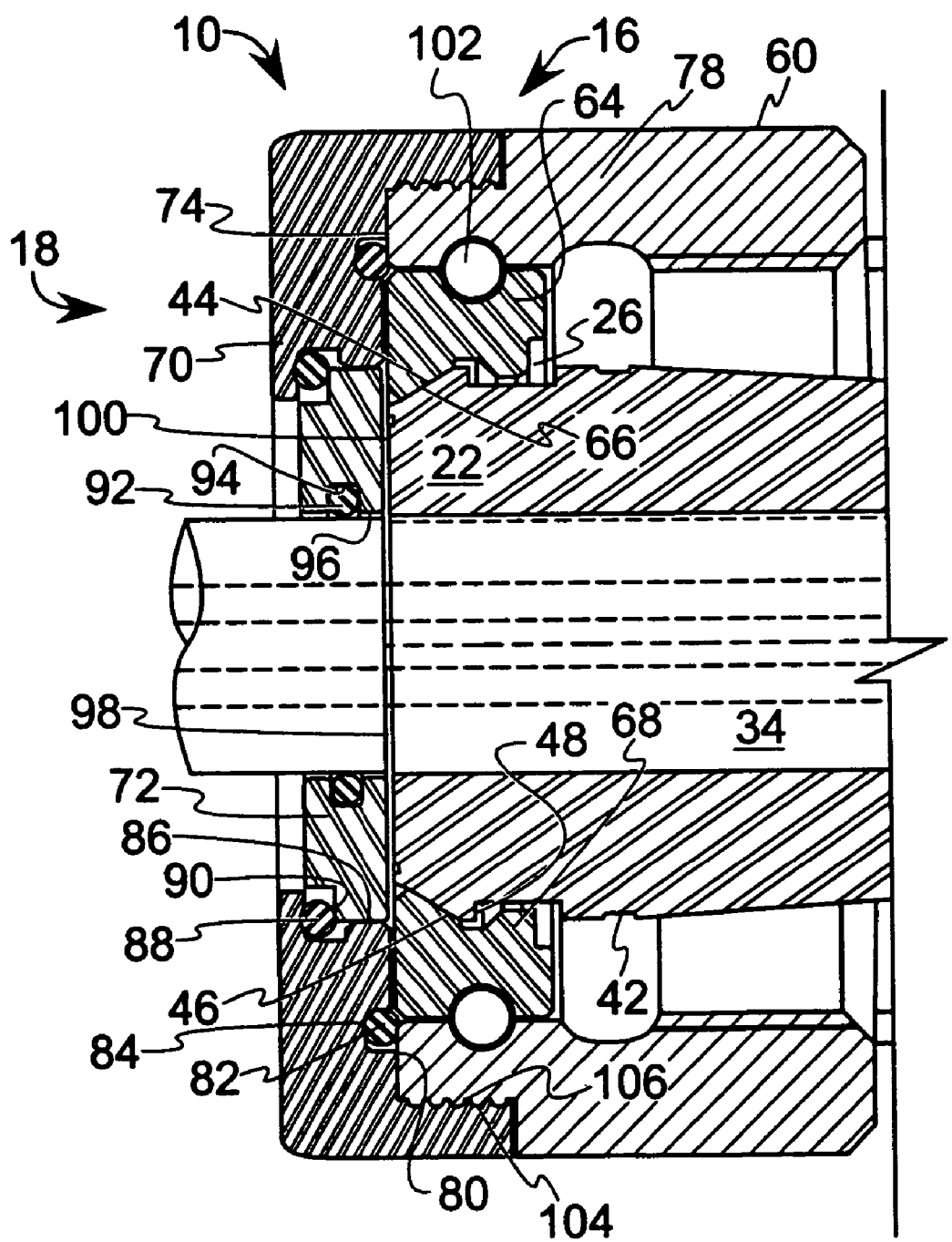
FIG. 4 is a partial cross-sectional view of a collet and lock nut similar to that shown in FIG. 3 with a variation in fasteners for attaching a cooling ring to the lock nut.

This invention is not intended to be limited to the fastening elements shown and described above, but instead may be practiced with other fastening elements. For example, as shown in FIG. 4, the lock nut 16 may have a screw thread 104 that circumscribes its outer diameter distal end portion. Similarly, the coolant sealing ring 18 (i.e., the sealing disk cap 70) may have a screw thread 106 that circumscribes its inner diameter, as shown. The screw threads 104, 106 mate to permit the coolant sealing ring 18 to be attached to the lock nut 16 in a manner that renders the coolant sealing ring 18 detachable. It should be noted that the threads 104, 106 are preferably acme threads, rope threads, or other threads other than conventional V-shaped threads, which may subject an operator to injury when operating the machine without the coolant sealing ring 18. Other fasteners may include but are not limited to snap ring configurations, bayonet lock configuration, or quick-disconnect configurations, such as those quick-disconnects that employ spring balls or the like.

It should be noted that the nose 100 of the collet 12 is flush or substantially flush with the front face 74 of the annular housing 60. This flush relation is preferred because, upon removing the coolant sealing ring 18, the collet is neither extending from nor recessed within the lock nut 16. Consequently, the length of the chuck assembly 10 is minimized, as desired.

The present invention described above may be practiced with existing inventory by using a conventional lock nut, a conventional sealing disk cap, and a conventional sealing disk as modified above. That is, a conventional lock nut (i.e., without tapped holes) may be modified to include a plurality of tapped holes. A conventional sealing disk cap may be modified to include through holes that are adapted to align with the tapped holes in the lock nut. Moreover, a conventional collet sealing disk may be inserted backwards into the inner diameter 86 of the sealing disk cap 70. This eliminates the need to manufacture new inventory.

However, in the preferred embodiment of the invention, an existing inventory of lock nuts would not be modified to accept a coolant sealing ring. This is because existing lock nuts are made of hardened steel do not lend themselves to the provision of tapped holes. While not impossible, the cost would probably be higher than making lock nuts from scratch. The threaded embodiment of the invention, as illustrated in FIG. 4, is more feasible but less desirable as a saleable product. The new design would likely replace the existing design as replenishment of inventory is required.

The term fluid tight, according to a preferred embodiment of the invention, should be understood to substantially prevent passage of fluid. For example, conventional metal to metal contact may provide a seal but the seal would not prevent passage of fluid therethrough. The fluid tight seals according to the present invention substantially prevent passage of fluid. The fluid tight seal may be any seal that substantially prevents passage of fluid, including, but not limited to, an elastic material, an elastomeric material, or more specifically, a rubber material, such as flurocarbon rubber.

Figure 5:
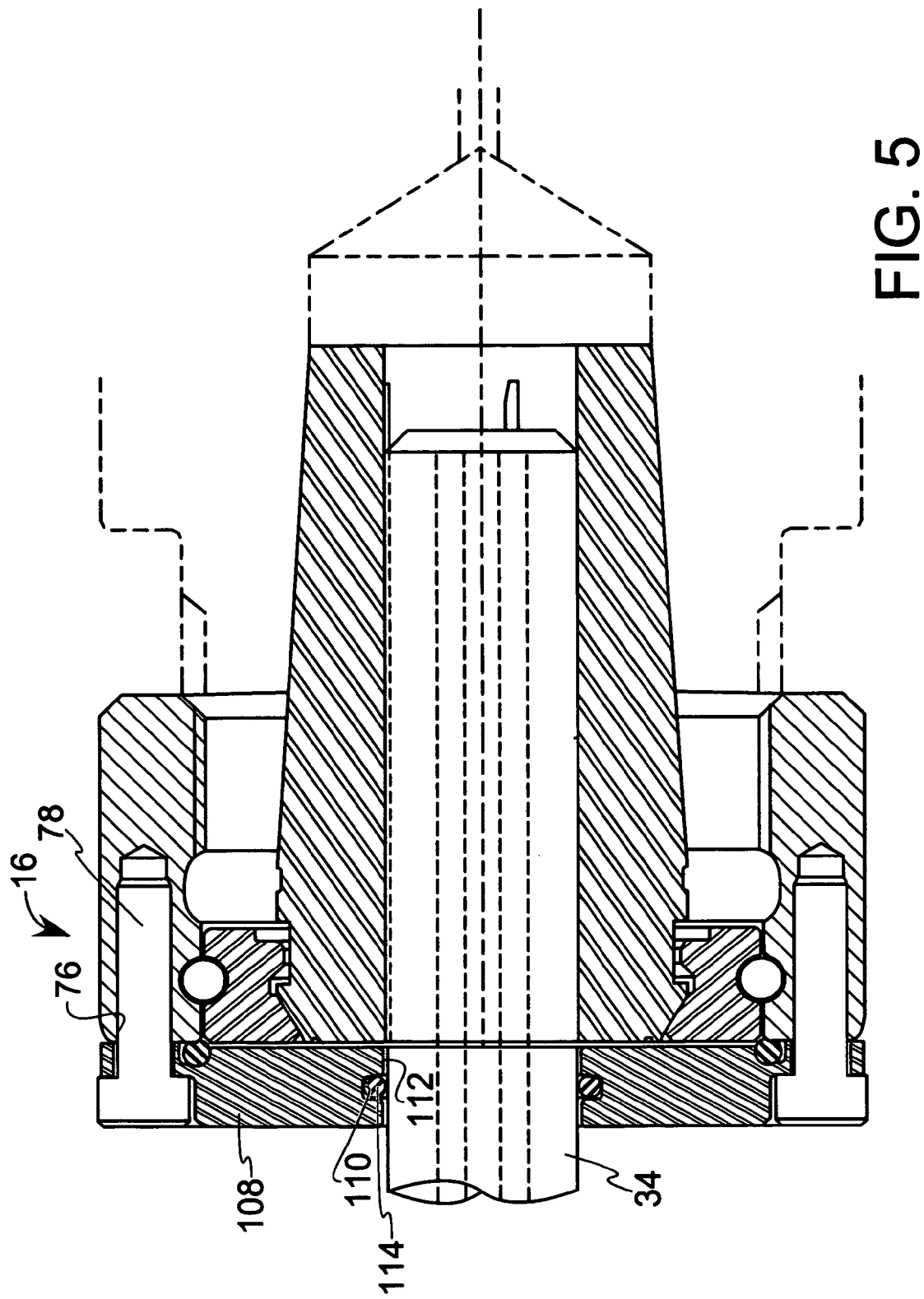
FIG. 5 is a cross-sectional view of a collet and lock nut according to an alternative embodiment of the invention.
Figure 6:
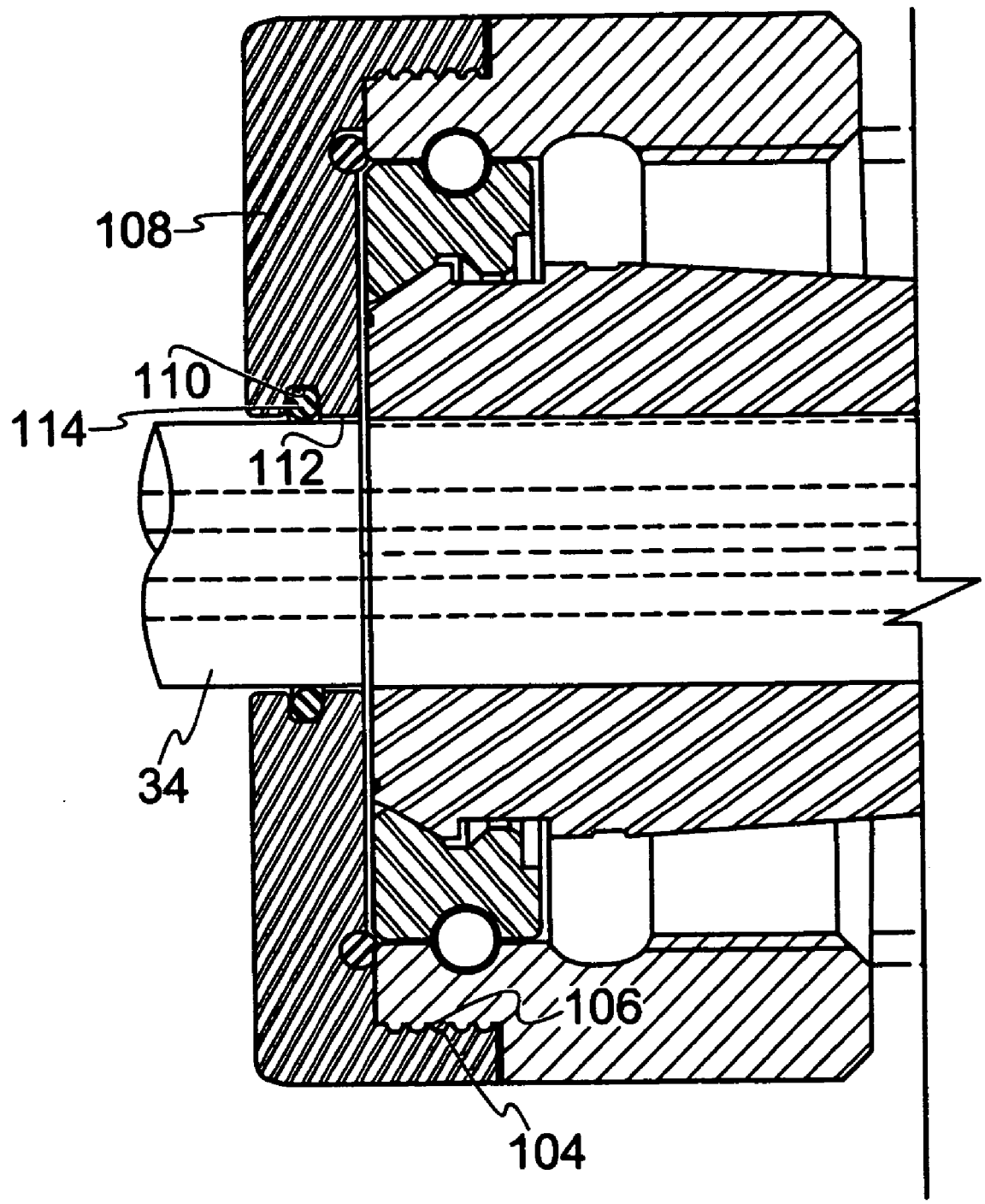
FIG. 6 is a partial cross-sectional view of a collet and lock nut similar to that shown in FIG. 5 with a variation in fasteners for attaching a cooling ring to the lock nut.

A coolant sealing ring according to an alternative embodiment of the invention is shown in FIG. 5. In this coolant sealing ring, the detachable sealing disk cap 70 and the collet sealing disk 72, described above, may be eliminated, as shown, and replaced with a single unitary sealing disk, as indicated at 108. Like the sealing disk 72 described above, this sealing disk 108 may be provided with a groove 110, which may be in the form of a tapered groove, in its inner diameter wall 112 for receiving a fluid tight seal 114, such as the O-ring shown. The seal 114, like the seal 92 described above, provides a seal between the cutting tool shank 34 and the sealing disk 108. The sealing disk 108 according to this embodiment of the invention may be attached to the lock nut 16 by the provision of other fasteners, such as tapped holes 76 and screws 78, which may be threadable into the tapped holes 76 to render the sealing disk 108 detachable. Alternatively, as illustrated in FIG. 6, the lock nut 16 may be provided with a circumscribed screw thread 104 and the sealing disk 106 may be provided with a mating circumscribed screw thread 104. Other fasteners may include but are not limited to snap ring configurations, bayonet lock configuration, or quick-disconnect configurations, such as those quick-disconnects that employ spring balls or the like.

The documents, patents and patent applications referred to herein are hereby incorporated by reference.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A tool-holding chuck assembly comprising: a collet for receiving a cutting tool shank having at least one coolant access hole therethrough, the collet having a nose; a lock nut for creating a gripping force between the collet and the cutting tool shank, the lock nut having an outer front face that is substantially flush with the nose of the collet; a coolant sealing ring attached to the lock nut so that the coolant sealing ring may be detached from the lock nut, the coolant sealing ring being structured to permit the tool shank to extend therethrough, wherein the coolant sealing ring comprises: a sealing disk through which the tool shank may extend and a sealing disk cap for receiving the sealing disk; a first fluid tight seal between the sealing disk cap and the lock nut; a second fluid tight seal between the sealing disk cap and the sealing disk; and a third fluid tight seal carried by the sealing disk that is adapted to engage the tool shank.

2. The assembly of claim 1, wherein the coolant sealing ring comprises: a face with a groove therein; and an inner diameter wall with a groove therein, wherein the first seal is in the face groove and a second seal is in the inner diameter wall groove.

3. The assembly of claim 1, a wherein the fluid tight seals are elastic material.

4. The assembly of claim 1, wherein the fluid tight seals are elastomeric material.

5. The assembly of claim 1, wherein the fluid tight seals are rubber O-rings.

6. The assembly of claim 1, wherein one or more tapped holes are in the front face of the lock nut and the coolant sealing ring is attachable to the front face of the lock nut by one or more screws, which are threadable into the tapped holes to render the coolant sealing ring detachable from the lock nut.

7. The assembly of claim 1, wherein the lock nut has an outer diameter distal end portion with a circumscribed screw thread and the coolant sealing ring has an inner diameter with a circumscribed screw thread that mates with the lock nut screw thread to permit the coolant sealing ring to be attached to the lock nut in a manner that renders the coolant sealing ring detachable from the lock nut.

8. The assembly of claim 1, wherein the coolant sealing ring has a face and the first seal is positioned between the face of the lock nut and the face of the coolant sealing ring to prevent coolant fluid from passing therebetween.

9. The assembly of claim 8, wherein the first seal resides in a groove in the face of the coolant sealing ring.

10. A tool-holding chuck assembly comprising: a collet comprising a tubular collet body having a nose and defining a cylindrically shaped passageway for receiving a tool shank, the passageway being adapted to direct pressurized coolant to coolant access holes in the tool shank; a lock nut formed from an annular housing having an outer front face that is substantially flush with the nose of the collet body; a coolant sealing ring attached to the annular housing so that the coolant sealing ring is detachable from the annular housing, wherein the coolant sealing ring comprises: a sealing disk and a sealing disk cap for receiving the sealing disk; a first fluid tight seal provided between the annular housing and the coolant sealing ring; a second fluid tight seal for providing a seal between the cutting tool shank and the coolant sealing ring; and a third fluid tight seal between the sealing disk and the sealing disk cap, the coolant sealing ring being attached to the annular housing by the sealing disk cap with the first fluid tight seal therebetween.

11. The assembly of claim 10, wherein the front face of the annular housing has a plurality of tapped holes therein and the coolant sealing ring is attached to the front face of the annular housing by screws that are threadable into the tapped holes to render the coolant sealing ring detachable from the annular housing.

12. The assembly of claim 10, wherein the annular housing has an outer diameter distal end portion with a circumscribed screw thread and the coolant sealing ring has an inner diameter with a circumscribed screw thread that mate with the screw thread of the annular housing to permit the coolant sealing ring to be attached to the annular housing in a manner that renders the coolant sealing ring detachable from the annular housing.

13. The assembly of claim 10, wherein the coolant sealing ring has an inner diameter wall and a groove in the inner diameter wall and the second fluid tight seal is in the groove.

14. A tool-holding chuck assembly comprising: a collet for receiving a cutting tool shank having at least one coolant access hole therethrough, the toilet having a nose; and a lock nut for creating a gripping force between the collet and the cutting tool shank, the lock nut having an outer front face that is substantially flush with the nose of the collet, the lock nut further having a fastening element that mates with a fastening element of a coolant sealing ring for attaching the coolant sealing ring to the lock nut so that the coolant sealing ring may be detached from the locknut, wherein the coolant sealing ring comprises: a sealing disk through which the tool shank may extend and a sealing disk cap for receiving the sealing disk; a first fluid tight seal between the sealing disk cap and the lock nut; a second fluid tight seal between the sealing disk cap and the sealing disk; and a third fluid tight seal carried by the sealing disk that is adapted to engage the tool shank.

* * * * *